United States Patent Office 2,723,299
Patented Nov. 8, 1955

2,723,299

PREPARATION OF STYRENE AND BENZENE FROM ACETYLENE AND VINYLACETYLENE

Manzo Tanaka and Kazumi Yamamoto, Omuta-shi, Fukuoka-ken, and Mitsuo Oku, Tamana-gun, Kumamoto-ken, Japan, assignors to Mitsui Kagaku Kogyo Kabushiki Kaisha, Tokyo, Japan No Drawing. Application August 22, 1952,
Serial No. 305,916

Claims priority, application Japan August 29, 1951

9 Claims. (Cl. 260—669)

This invention relates to the synthesis of styrene and benzene. More particularly, it relates to the preparation of styrene and benzene by polymerizing acetylene, alone or with monovinylacetylene, in the presence of specific solvents and catalysts.

In his "Neue Entwicklungen auf dem Gebiet der Chemie des Acetylens und Kohlenoxyds, Springer Verlag 1949," W. Reppe disclosed that benzene and styrene are synthesized in proportion of 88:12 (half of styrene is polymerized) by polymerization of acetylene under pressure, in the presence of a specific solvent, using certain organic phosphine-nickelcarbonyl complexes as catalyst.

It is an object of this invention to provide an improved process for the manufacture of benzene and styrene from readily available and quite inexpensive materials, said process being characterized in producing much larger quantities of styrene than the process hitherto practised. Other and further objects of this invention will be apparent from the description following.

It has been found, according to the present invention, that the yield of styrene, which is an important raw material for plastics, is highly increased, and the formation of benzene is suppressed by either co-polymerizing acetylene and monovinylacetylene in the presence of triphenylphosphinenickel-bicarbonyl, or by polymerizing acetylene alone with the help of co-catalysts which act to dimerize acetylene to monovinylacetylene.

While the reasons for the reaction by which styrene and benzene are produced from acetylene are not yet made clear, it is believed that the following equations represent the formation of styrene according to the present invention:

(1) 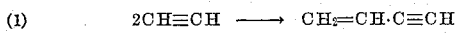

2CH≡CH ⟶ CH₂=CH·C≡CH (2)
2CH≡CH + CH₂=CH·C≡CH (that is,

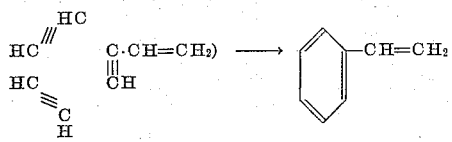

Consequently, in order that the yield of styrene will be highly increased, monovinylacetylene which is separately prepared may be added from the start of the reaction process; more preferably, monovinylacetylene may be added every time together with acetylene which is to be introduced periodically, or a part of the acetylene introduced may be dimerized, in the course of the reaction, to monovinylacetylene by the help of a co-catalyst.

The main catalyst which is employed in the practice of the present invention is triphenylphosphinenickel-bicarbonyl ((C₆H₅)₃P)₂ Ni(CO)₂ which is produced from triphenyl phosphine and nickel carbonyl. The co-catalysts which are employed in the practice of the invention are the complex compounds of copper- or mercury-halogenide with trialkyl- or triarylphosphine, or the complex compounds of copper halide with ammonium salts or with amine-hydrogen halogenide salts. The components of each complex compound may also be added in the course of the reaction process as described further in the examples of the invention. The amount of the main catalyst to be employed is usually of the order of 3 to 10% based on the weight of the solvent, and the amount of the co-catalyst is of the order of 0.15 to 1.0%.

Benzene, acetonitrile or tetrahydrofuran is preferred as solvent. The reaction is preferably conducted by treating a mixture of a solvent, nitrogen, acetylene and monovinylacetylene, in a suitable pressure-tight vessel, in the presence of the aforesaid catalyst, said nitrogen being used as diluent for acetylene. Monovinylacetylene may be omitted in case a co-catalyst is used. In general, moderate atmospheric pressures are used, and preferably total pressure within the range of 70 to 700 lbs./sq. in. is used. Excellent results are obtained at temperatures within the range of about 40° to 150° C., and more particularly about 60° to 130° C., and with a total pressure of 140 to 450 lbs./sq. in. in which the partial pressure of nitrogen may be 40 to 140 lbs./sq. in.

In some methods of practicing the invention, the relative proportion of acetylene to monovinylacetylene to be introduced may be the stoichiometrically required quantities, although other proportions such as 1.5:1 to 20:1 in molar ratio may be employed if desired. Excellent results are obtained with the molar ratio of

CH≡CH:CH₂=CH·C≡CH in the range of about 2:1 to 10:1.

A detailed description is given hereunder concerning the methods of practicing the invention which can be divided into three classes. According to the first method, monovinylacetylene, a solvent and a catalyst are placed in a pressure-tight vessel. The air in the vessel is swept away by oxygen-free nitrogen which is introduced in the vessel under a low pressure, and then acetylene is introduced under pressure. The reaction mixture is heated, first, at 100° to 150° C. for several minutes, whereby the catalyst is developed actually to an active state, and then cooled to 60° to 80° C., the pressure in the vessel being maintained within the range of 140 to 450 lbs./sq. in. by the periodic addition of acetylene under pressure. After the reaction is completed, as determined by the quantities of acetylene required, the contents of the vessel are discharged and the products are isolated by the means well known to those skilled in the art, e. g., fractional distillation, etc. In this method, the amount of monovinylacetylene to be added is limited to about 25% based on the weight of the solvent, in order to avoid an undesirable side reaction, e. g., the formation of insoluble resinous products.

In the second method, a solvent and a catalyst are charged in the vessel. The air is swept away by nitrogen, and nitrogen and acetylene are introduced under pressure as mentioned above. After the catalyst is developed as in the first method, monovinylacetylene, which is stored with a small amount of pyrogallol in a pressure-tight vaporizer (through which acetylene is introduced under pressure at a required temperature) is periodically introduced together with compressed acetylene in the form of saturated mixture-gas at the proportion determined theoretically by the temperature of the vaporizer. After the reaction is completed, the products are treated as in the first method.

In the third method, monovinylacetylene is not added at all. Instead of adding monovinylacetylene, the aforementioned co-catalyst is used together with the main catalyst, and the reaction is conducted substantially in the same manner as that of the first method.

The combinations of the above methods also are effective to attain the objects of the present invention.

If desired, a small amount of a certain polymerization inhibitor, such as hydroquinone or pyrogallol, may be employed in the reaction process in order to prevent polymerization of styrene produced.

The invention is further illustrated, but not limited, by the following examples:

Example 1

Fifty grams of benzene, 3 grams of triphenylphosphine nickel-bicarbonyl, 7 grams of monovinylacetylene (0.14 mole) and 0.05 gram of pyrogallol were charged in a stainless steel reactor. The air in the reactor was swept away by nitrogen which was continued to be introduced in the reactor up to a pressure of 70 lbs./sq. in., and then acetylene was introduced up to a pressure of 150 lbs./sq. in. The mixture was then heated to 115° C. When this temperature was reached abrupt pressure-drop was observed, and the catalyst was developed in an active state. The reactor was cooled to 60° C. and 300 lbs./sq. in. acetylene pressure was applied. Then, acetylene was again introduced under pressure periodically so as to maintain the pressure within the range of 250 to 300 lbs./sq. in. It took approximately 9 hours to have 62 l. of acetylene (2.8 moles) reacted. The reactor was cooled and its contents were discharged. The gain in weight amounted to 72 grams. From the reaction product, 20.5 grams of styrene and 50 grams of benzene, besides the recovery of 100% of the amount of benzene initially present, were obtained by fractional distillation. The proportion of benzene to styrene was 71:29.

Example 2

Fifty grams of benzene, 3 grams of triphenyl phosphine nickel-bicarbonyl and 0.05 gram of pyrogallol were charged in a stainless steel reactor. The same process as in Example 1 was repeated until the catalyst was developed, and the reactor was cooled to 70° C. The compressed acetylene was periodically introduced together with monovinylacetylene which had been stored at 60° C. in a pressure-tight vaporizer (through which the compressed acetylene is introduced to the reactor) in the form of saturated mixture-gas within the range of 300 to 400 lbs./sq. in. In this case, the molar ratio of $CH \equiv CH$ to $CH_2 = CH \cdot C \equiv CH$ was calculated as about 5:1. After 10 hours, the amount of acetylene introduced was calculated as 52 l. together with 12 grams of monovinylacetylene. From the reaction product, 27.5 grams of styrene and 30.5 grams of benzene, besides the recovery of benzene initially present as solvent, were obtained. The proportion of benzene to styrene was 52.5:47.5.

Example 3

Fifty grams of benzene, 3 grams of triphenylphosphine nickel-bicarbonyl and 0.05 gram of pyrogallol were charged in a stainless steel reactor. The same process as in Example 1 was repeated until the catalyst was developed, and the reactor was cooled to 80° C. The compressed acetylene was periodically introduced together with monovinylacetylene which had been stored at 80° C. in a pressure-tight vaporizer (through which the compressed acetylene is introduced) in the form of saturated mixture-gas within the range of 280 to 300 lbs./sq. in. In this case, the molar ratio of $CH \equiv CH$ to $CH_2 = CH \cdot C \equiv CH$ was calculated as about 2:1. After 7 hours, the amount of acetylene introduced was calculated as 22 l. together with 25 grams of monovinylacetylene. The reactor was cooled and its contents were discharged. From the reaction product, 28.5 grams of styrene and 13.5 grams of benzene, besides the recovery of benzene initially present, were obtained. The proportion of benzene to styrene was 32:68.

Example 4

Fifty grams of benzene, 3 grams of triphenylphosphine nickel-bicarbonyl, 0.2 gram of mercuric iodide triphenylphosphine complex $HgI_2((C_6H_5)_3P)_2$ (m. 243–5° C.) (which is prepared from $HgI_2$ and triphenylphosphine in alcohol) and 0.05 gram of pyrogallol were charged in a stainless steel reactor. The same process as in Example 1 was repeated until the catalyst was developed, and the reactor was cooled to 90° C. The compressed acetylene was periodically introduced together with monovinylacetylene which had been stored at 60° C. in a pressure-tight vaporizer (through which the compressed acetylene is introduced) in the form of saturated mixture-gas within the range of 300 to 400 lbs./sq. in. In this case, the molar ratio of $CH \equiv CH$ to $CH_2 = CH \cdot C \equiv CH$ was calculated as about 5:1. After 8 hours, the amount of acetylene introduced was calculated as 43.5 l. together with 10 grams of monovinylacetylene. From the reaction product, 26 grams of styrene and 22.5 grams of benzene, besides the recovery of benzene initially present as solvent, were obtained. The proportion of benzene to styrene was 46:54.

Example 5

Fifty grams of benzene (acetonitrile may be used instead of benzene), 3 grams of triphenylphosphine nickel-bicarbonyl, 0.3 gram of cuprous iodide triethylphosphine $CuI((C_2H_5)_3P)_2$ (m. 38° C.), and 0.05 gram of pyrogallol were charged in a stainless steel reactor. The same process as in Example 1 was repeated until the catalyst was developed, and the reactor was cooled to 90° C. The compressed acetylene was periodically introduced together with monovinylacetylene which had been stored at 80° C. in a pressure-tight vaporizer (through which the compressed acetylene is introduced) in the form of saturated mixture-gas within the range of 280 to 360 lbs./sq. in. In this case, the molar ratio of $CH \equiv CH$ to $CH_2 = CH \cdot C \equiv CH$ was calculated as about 2:1. After 8 hours, the amount of acetylene introduced was calculated as 26.5 l. together with 30 grams of monovinylacetylene. The reactor was cooled and its contents were discharged. From the reaction product, 35 grams of styrene and 13 grams of benzene, besides the recovery of benzene initially present as solvent, were obtained. The proportion of benzene to styrene was 27:73.

Example 6

Fifty grams of benzene, 3 grams of triphenylphosphine nickel-bicarbonyl, and 0.2 gram of mercuric iodide triphenylphosphine complex $HgI_2((C_6H_5)_3P)_2$ (m. 243–5° C.) were charged in a stainless steel reactor. The air in the reactor was swept away by nitrogen which was continued to be introduced in the reactor up to a pressure of 50 lbs./sq. in., and then acetylene was introduced up to a pressure of 150 lbs./sq. in. The mixture was then heated to 130° C. When this temperature was reached, abrupt pressure-drop was observed, and the catalyst was developed in an active state. The reactor was cooled to 90° C. and 300 lbs./sq. in. acetylene pressure was applied. Then, pure acetylene was introduced under pressure periodically so as to maintain the pressure within the range of 250 to 400 lbs./sq. in. The completion of the reaction process is observed by the fact that no more pressure-drop occurs. At that time, the contents of the reactor were discharged. The gain in weight amounted to 129.6 grams. From the reaction product, 20.5 grams of styrene and 79.6 grams of benzene, besides the recovery of benzene initially present as solvent, where obtained. The proportion of benzene to styrene was 79.5:20.5.

Example 7

Fifty grams of benzene, 3 grams of triphenylphosphine nickel-bicarbonyl, 0.2 gram of cuprous chloride and 0.08 gram of dimethylamine hydrochloride were charged in a stainless steel reactor. The same process as in Example 6 was repeated. The gain in weight amounted to 49 grams. From the reaction product, 11 grams of styrene and 21.5 grams of benzene, besides the recovery of benzene initially present as solvent, were obtained. The proportion of benzene to styrene was 66:34.

Though we have herein set forth specific embodiments of our invention, it is not our intention to be wholly limited thereto. For, to those skilled in the art, there are many apparent variations and modifications such as the variations of quantities used and a substitution of equivalent materials that do not depart from the scope of our invention as set forth in the following claims.

We claim:

1. A process for preparing styrene and benzene which comprises heating a mixture in a molar ratio of 1.5:1 to 20:1 of acetylene and monovinylacetylene to a temperature of 40° to 150° C. under a pressure within the range of 70 to 700 lbs./sq. in. in a solvent selected from the group consisting of benzene, acetonitrile and tetrahydrofuran, in the presence of triphenylphosphine nickel-bicarbonyl as catalyst, and recovering styrene and benzene from the reaction mixture.

2. A process for preparing styrene and benzene which comprises heating acetylene to a temperature of 40° to 150° C. under a pressure within the range of 70 to 700 lbs./sq. in. in a solvent selected from the group consisting of benzene, acetonitrile and tetrahydrofuran, in the presence of triphenylphosphine nickel-bicarbonyl, as main catalyst, and of a complex compound of mercury halide with triarylphosphine as co-catalyst, and recovering styrene and benzene from the reaction mixture.

3. A process for preparing styrene and benzene which comprises heating acetylene to a temperature of 40° to 150° C. under a pressure within the range of 70 to 700 lbs./sq. in. in a solvent selected from the group consisting of benzene, acetonitrile and tetrahydrofuran, in the presence of triphenyl-phosphine nickel-bicarbonyl, as main catalyst, and of a complex compound of copper halide with trialkylphosphine as co-catalyst, and recovering styrene and benzene from the reaction mixture.

4. A process for preparing styrene and benzene which comprises heating acetylene to a temperature of 40° to 150° C. under a pressure within the range of 70 to 700 lbs./sq. in. in a solvent selected from the group consisting of benzene, acetonitrile and tetrahydrofuran, in the presence of triphenyl-phosphine nickel-bicarbonyl, as main catalyst, and of a complex compound of copper halide with triarylphosphine as co-catalyst, and recovering styrene and benzene from the reaction mixture.

5. A process for preparing styrene and benzene which comprises heating acetylene to a temperature of 40° to 150° C. under a pressure within the range of 70 to 700 lbs./sq. in. in a solvent selected from the group consisting of benzene, acetonitrile and tetrahydrofuran, in the presence of triphenyl-phosphine nickel-bicarbonyl, as main catalyst, and of a complex compound of copper halide with an ammonium salt as co-catalyst, and recovering styrene and benzene from the reaction mixture.

6. A process for preparing styrene and benzene which comprises heating acetylene to a temperature of 40° to 150° C. under a pressure within the range of 70 to 700 lbs./sq. in. in a solvent selected from the group consisting of benzene, acetonitrile and tetrahydrofuran, in the presence of triphenyl-phosphine nickel-bicarbonyl, as main catalyst, and of a complex compound of copper halide with an amine hydrochloric acid salt as co-catalyst, and recovering styrene and benzene from the reaction mixture.

7. A process for preparing styrene and benzene which comprises heating acetylene to a temperature of 40° to 150° C. under a pressure within the range of 70 to 700 lbs./sq. in. in a solvent selected from the group consisting of benzene, acetonitrile and tetrahydrofuran, in the presence of triphenyl-phosphine nickel-bicarbonyl, as main catalyst, and of a complex compound of cuprous chloride with dimethyl amine hydrochloride as co-catalyst, and recovering styrene and benzene from the reaction mixture.

8. A process for preparing styrene and benzene which comprises heating acetylene to a temperature of 40° to 150° C. under a pressure within the range of 70 to 700 lbs./sq. in. in a solvent selected from the group consisting of benzene, acetonitrile and tetrahydrofuran, in the presence of triphenyl-phosphine nickel-bicarbonyl, as main catalyst, and of a complex compound of mercury iodide with triphenylphosphine as co-catalyst, and recovering styrene and benzene from the reaction mixture.

9. A process for preparing styrene and benzene which comprises heating a mixture of acetylene and monovinylacetylene, said monovinylacetylene together with compressed acetylene being periodically introduced into reaction vessel in a molar ratio of 2:1 to 10:1 to a temperature of 40° to 150° C. under a pressure within the range of 70 to 700 lbs./sq. in. in a solvent selected from the group consisting of benzene, acetonitrile and tetrahydrofuran, using triphenyl-phosphine nickel-bicarbonyl as catalyst, and recovering styrene and benzene from the reaction mixture.

References Cited in the file of this patent

UNITED STATES PATENTS

| | | |
|---|---|---|
| 2,161,645 | Vollman et al. | June 6, 1939 |
| 2,163,223 | Zavka | June 20, 1939 |

OTHER REFERENCES

Reppe et al.: Annalen der Chemie (Liebig), vol. 560, page 111 (1948) (1 page only). Abstracted in Chem. Abstracts, vol. 43 (1949), column 6202 (1 page).